United States Patent
Meisel

(10) Patent No.: US 8,453,502 B2
(45) Date of Patent: Jun. 4, 2013

(54) MICROMECHANICAL STRUCTURE AND METHOD FOR OPERATING A MICROMECHANICAL STRUCTURE

(75) Inventor: Daniel Christoph Meisel, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 12/924,756

(22) Filed: Oct. 5, 2010

(65) Prior Publication Data

US 2011/0079080 A1    Apr. 7, 2011

(30) Foreign Application Priority Data

Oct. 7, 2009   (DE) .......................... 10 2009 045 431

(51) Int. Cl.
*G01C 19/56*   (2012.01)

(52) U.S. Cl.
USPC ................... 73/504.12; 73/504.14; 73/504.04

(58) Field of Classification Search
USPC ............... 73/504.12, 504.14, 504.04, 504.02, 73/504.16, 514.32
See application file for complete search history.

(56) References Cited

U.S. PATENT DOCUMENTS

| | | | |
|---|---|---|---|
| 6,705,164 B2 * | 3/2004 | Willig et al. | 73/504.12 |
| 8,011,244 B2 * | 9/2011 | Diem | 73/504.12 |
| 8,176,779 B2 * | 5/2012 | Blomqvist | 73/504.12 |
| 8,261,614 B2 * | 9/2012 | Hartmann et al. | 73/504.12 |
| 2008/0078246 A1 | 4/2008 | Li | |
| 2010/0139399 A1 * | 6/2010 | Geiger et al. | 73/504.12 |
| 2011/0132087 A1 * | 6/2011 | Ohms et al. | 73/504.12 |

FOREIGN PATENT DOCUMENTS

WO    WO 02/066928    8/2002

* cited by examiner

*Primary Examiner* — Helen Kwok

(74) *Attorney, Agent, or Firm* — Kenyon & Kenyon LLP

(57) ABSTRACT

A micromechanical yaw rate sensor includes a substrate having a main plane of extension and two Coriolis elements. The first Coriolis element may be driven to a first vibration along a second direction which is parallel to the main plane of extension. The second Coriolis element may be driven to a second vibration which is antiparallel to the first vibration. A first deflection of the first Coriolis element and a second deflection of the second Coriolis element, in each case along a first direction which is parallel to the main plane of extension and perpendicular to the second direction, may be detected. The micromechanical sensor also has a rocker element indirectly or directly coupled to the first Coriolis element and to the second Coriolis element, which rocker element has a torsional axis essentially parallel to the second direction.

7 Claims, 2 Drawing Sheets

MICROMECHANICAL STRUCTURE AND METHOD FOR OPERATING A MICROMECHANICAL STRUCTURE

BACKGROUND OF THE INVENTION

1. FIELD OF THE INVENTION

The present invention relates to a micromechanical structure, e.g., a yaw rate sensor.

2. DESCRIPTION OF RELATED ART

Such micromechanical structures are generally known, e.g., a yaw rate sensor is known from published international patent application document WO 02/066928 A1, which document discloses a sensor including a first and a second Coriolis element. The first and second Coriolis elements are situated above a surface of a substrate, excitation means being provided via which the Coriolis elements may be excited to vibrations parallel to a first axis, and detection means being provided via which a deflection of the Coriolis elements as the result of a Coriolis force may be detected in a second axis which is perpendicular to the first axis. The first and the second axis are oriented parallel to the surface of the substrate. Thus, this yaw rate sensor only allows detection of a yaw rate which is perpendicular to the surface of the substrate. In addition, a further yaw rate sensor is known from published U.S. patent application document U.S. 2008/0078246 A1, in which a first and a second Coriolis element are connected to a rocker structure. The rocker structure may be swiveled about a torsional axis which is parallel to a substrate surface, the first and second Coriolis elements being excited to a vibration which is parallel to the substrate surface. A yaw rate which is oriented parallel to the main plane of extension and perpendicular to the vibration of the Coriolis elements causes a Coriolis force perpendicular to the substate surface which acts on the Coriolis elements, which causes the rocker structure to undergo torsional deflection about the torsional axis. Thus, this yaw rate sensor only allows detection of a yaw rate which is parallel to the surface of the substrate.

BRIEF SUMMARY OF THE INVENTION

The micromechanical structure according to the present invention and the method according to the present invention for operating a micromechanical structure have the advantage over the related art that both the second yaw rate parallel to the main plane of extension and the first yaw rate perpendicular to the main plane of extension may be measured using the one micromechanical structure. Furthermore, the micromechanical structure has a comparatively compact design, so that wafer surface area and therefore manufacturing costs may be advantageously saved, and in addition the micromechanical structure may be integrated in a greatly simplified manner. These advantages are achieved in that the micromechanical structure has a rocker structure via which the first and second Coriolis elements are at least indirectly coupled. The second yaw rate causes Coriolis forces which act in particular on the first and second Coriolis elements, parallel to the third direction, and which are indirectly or directly transmitted to the rocker structure, so that the torsional deflection of the rocker structure is induced as a function of the Coriolis forces parallel to the third direction. Thus, a measurement of this torsional deflection allows the second yaw rate to be determined. At the same time, the first deflection of the first Coriolis element and the second deflection of the second Coriolis element are measured, thus allowing a determination of the first yaw rate independently of the determination of the second yaw rate. The micromechanical structure according to the present invention in particular advantageously allows both a fully differential determination of the first yaw rate and a fully differential determination of the second yaw rate, so that in both cases a comparatively good signal-to-noise ratio is achieved. The micromechanical structure may be manufactured in a comparatively cost-effective manner, in particular in a standard micromechanical manufacturing process, the substrate preferably including a semiconductor substrate, and particularly preferably including a silicon substrate. The micromechanical structure preferably has a further rocker element having essentially the same design as the rocker element and being situated parallel to the rocker element.

According to one example embodiment, it is provided that the torsional axis is situated along the first direction, between the first and the second Coriolis element. Thus, a micromechanical structure is preferably achieved which is comparatively more compact and which has an essentially mirror-symmetrical design with respect to a mirror plane extending perpendicular to the main plane of extension and parallel to the torsional axis.

According to one example embodiment, it is provided that the first Coriolis element may be driven to a first vibration with the aid of a first drive frame, and the second Coriolis element may be driven to a second vibration with the aid of a second drive frame, the first Coriolis element preferably being coupled to the first drive frame, and/or the second Coriolis element preferably being coupled to the second drive frame via first spring elements, the first spring elements particularly preferably being designed to be more flexible along the first direction than along the second direction and/or along a third direction perpendicular to the main plane of extension. The first and second drive frames in combination with the first spring elements advantageously decouple the drive for the first and second vibrations from the first and second deflections. As a result, comparatively efficient first and second comb electrode structures may preferably be used for exciting the first and second vibrations, and fixed electrodes which are fixedly connected to the substrate and counterelectrodes which are coupled to the first and second Coriolis elements are intermeshed along the second direction, so that the counterelectrodes and the fixed electrodes overlap along the first direction. The counterelectrodes are advantageously situated on the first and second drive frames, which are coupled to the first and second Coriolis elements, in such a way that the first and second drive frames undergo essentially no motion along the first direction. Alternatively, it is provided that the Coriolis forces parallel to the third direction which are caused by the second yaw rate act directly on the first and second drive frames, which cause the torsional deflection of the rocker element, in this case the first and second Coriolis elements undergoing essentially no deflection parallel to the third direction. As the result of closed-loop operation, the deflection of the drive frame due to a Coriolis force along the third direction is preferably reduced. The first and/or second vibrations are preferably driven with the aid of a comb drive and/or a plate drive.

According to one example embodiment, it is provided that the rocker element is coupled to the first Coriolis element via the first drive frame, and is coupled to the second Coriolis element via the second drive frame, second spring elements preferably being situated between the first drive frame and the rocker element and/or between the second drive frame and the rocker element, and particularly preferably being designed to be more flexible along the second direction than along the first and/or third direction. The second spring elements are advantageously designed to be more rigid with respect to the third direction than with respect to the second direction, so that a motion of the Coriolis elements along the third direction is transmitted to the rocker element due to the second yaw rate, while the first and the second vibration are not transmitted to the rocker element. The rocker element is therefore driven to torsional deflection when the second yaw rate is present.

According to one example embodiment, it is provided that the rocker element has a recess in which the first Coriolis element, the second Coriolis element, the first drive frame, and/or the second drive frame is/are situated parallel to the main plane of extension, so that a particularly compact configuration of the micromechanical structure may advantageously be achieved. The rocker element is preferably fastened to the substrate via torsion springs, and in the present example embodiment is advantageously not driven to a motion parallel to the torsional axis or parallel to the torsion springs.

According to one example embodiment, it is provided that the rocker element is situated along the first direction, between the first and the second Coriolis element, third spring elements preferably being situated in each case between the first Coriolis element and the rocker structure and/or between the second Coriolis element and the rocker structure, and particularly preferably being designed to be more flexible along the first direction than along the second and/or third direction. The first and second Coriolis elements are advantageously directly coupled to the rocker structure, the third spring elements transmitting to the rocker structure only the Coriolis forces parallel to the third direction which are to be detected, while Coriolis forces parallel to the first direction cause essentially no torsional deflection of the rocker structure.

According to one example embodiment, it is provided that the first deflection may be detected with the aid of a first detection element, and/or that the second deflection may be detected with the aid of a second detection element, the first detection element preferably being situated within a first recess in the first Coriolis element, and/or the second detection element preferably being situated within a second recess in the second Coriolis element. The first and the second detection element preferably allow a fully differential evaluation of the first yaw rate, the first and the second detection element preferably including a plate capacitor structure embedded in the first and the second recess. The first and/or second detection elements preferably include finger electrode structures, i.e., interdigital structures.

The first and second detection elements are preferably supported on the first and second Coriolis elements, in such a way that the first and second detection elements are movable with respect to motions along the direction of detection, and are rigid with respect to motions along the drive direction.

According to one example embodiment, it is provided that a torsional deflection of the rocker element about the torsional axis may be detected with the aid of third detection elements which are preferably situated along the third direction, between the rocker element and the substrate. The third detection elements preferably include flat electrodes and flat counterelectrodes, the flat counterelectrodes preferably including oppositely situated end regions of the rocker structure perpendicular to the torsional axis which cooperate with flat electrodes in the form of a plate capacitor system for detection of the torsional deflection. The flat electrodes are situated in particular on the substrate along the third direction, between the flat counterelectrodes and the substrate. The torsional deflection is detected in particular in a fully differential manner via a change in the electrical capacitance between the flat electrodes and the flat counterelectrodes in each case. Alternatively, the third detection elements include a cover electrode, so that the rocker element is situated along the third direction, between the substrate and the cover electrode. The third detection elements particularly preferably include both the flat electrode and the cover electrode.

A further object of the present invention is to provide a method for operating a micromechanical structure for determining a first yaw rate oriented parallel to a third direction which is perpendicular to the main plane of extension, the first deflection of the first Coriolis element and the second deflection of the second Coriolis element are measured, and for determining a second yaw rate oriented parallel to the first direction a torsional deflection of the rocker element about the torsional axis is measured. As described above in detail, it is advantageously possible to determine the first and the second yaw rate independently of one another, using only a single micromechanical structure. The first and second Coriolis elements are preferably operated in a closed loop operation.

According to one example embodiment, it is provided that the first Coriolis element is driven to a first vibration with the aid of a first drive frame, and the second Coriolis element is driven to a second vibration with the aid of a second drive frame, the first drive frame preferably being driven using a first comb electrode structure and the second drive frame preferably being driven using a second comb electrode structure, so that a comparatively efficient excitation of the first and second vibrations may be achieved. Alternatively, the first and second vibrations may each be driven with the aid of a plate drive.

DETAILED DESCRIPTION OF THE INVENTION

Figure 1:
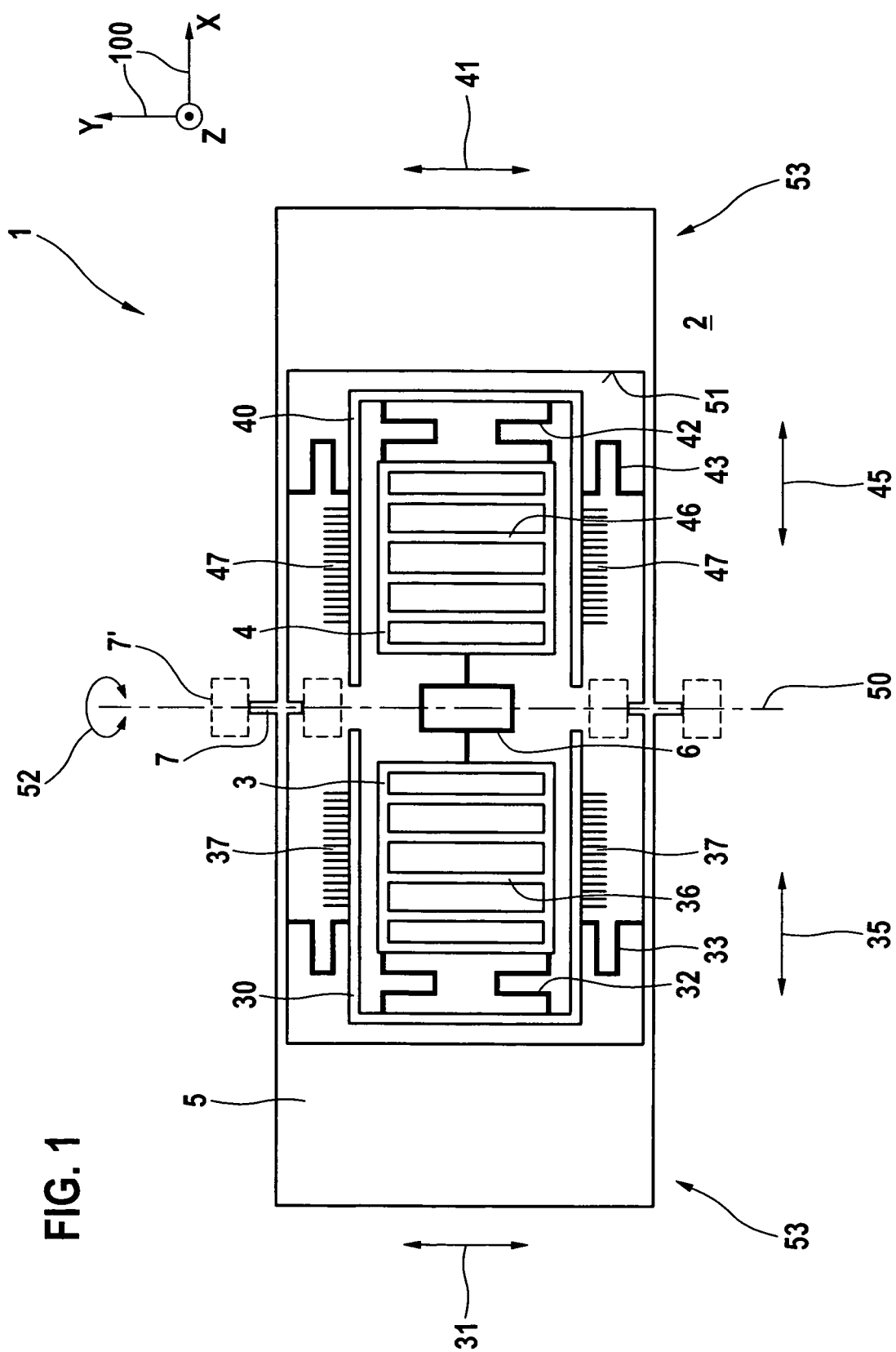
FIG. 1 schematically shows a top view of a micromechanical structure according to a first example embodiment of the present invention.

FIG. 1 illustrates a schematic top view of a micromechanical structure 1 according to a first example embodiment of the present invention, the micromechanical structure 1 including a substrate 2 having a main plane of extension 100. Micromechanical structure 1 also includes a first and a second Coriolis element 3, 4, first and second Coriolis elements 3, 4 being designed to be movable with respect to substrate 2 and being elastically coupled to one another via a fourth spring element 6. First Coriolis element 3 is driven, with the aid of a first drive frame 30, to a first vibration 31 along a second direction Y which is parallel to main plane of extension 100, first drive frame 30 being driven with the aid of a first comb electrode structure 37. First Coriolis element 3 and first drive frame 30 are elastically coupled to one another via first spring elements 32, first spring elements 32 being designed to be more rigid along second direction Y than along a first direction X which is perpendicular to second direction Y and parallel to main plane of extension 100. Similarly as for first Coriolis element 3, with the aid of a second drive frame 40 second Coriolis element 4 is excited to a second vibration 41 along second direction Y, second vibration 41 being antiparallel to first vibration 31. Second drive frame 40 is coupled to second Coriolis element 4 via further first spring elements 42, and is driven with the aid of a second comb electrode structure 47.

Micromechanical structure 1 also includes a rocker element 5 which is fastened to substrate 2 via torsion springs 7, rocker element 5 being pivotable about a torsional axis 50 which is defined by torsion springs 7 and which extends parallel to second direction Y. Torsion springs 7 are fastened to substrate 2 via anchoring elements 7'. First drive frame 30 is coupled to rocker structure 5 via second spring elements 33, and second drive frame 40 is coupled to rocker structure 5 via further second spring elements 43, second and further second spring elements 33, 43 being designed to be more flexible along second direction Y than along a third direction Z perpendicular to main plane of extension 100. Thus, there is little or no transmission of the drive motions of first and second drive frames 30, 40 to rocker element 5 along second direction Y. When a first yaw rate is present which has a rotational axis parallel to third direction Z, Coriolis forces act on first and second Coriolis elements 3, 4 along the first direction, first Coriolis element 3 being induced to a first deflection 35 along first direction X due to first vibration 31, and second Coriolis element 4 being induced to a second deflection 45, which is antiparallel to first deflection 35, along first direction X due to second vibration 41.

First deflection 35 may be detected with the aid of a first detection element 36 which is situated in a first recess in first Coriolis element 3 and which includes a first plate capacitor structure, while second deflection 45 may be detected with the aid of a second detection element 46 which is situated in a second recess in second Coriolis element 4. A differential evaluation of first detection signals by first detection element 36, and of second detection signals by second detection element 46, thus allows the first yaw rate to be determined. When a second yaw rate is present which has a rotational axis parallel to first direction X, further Coriolis forces act on first and second Coriolis elements 3, 4 along third direction Z, the further Coriolis forces being antiparallel on account of antiparallel first and second vibrations 31, 41. In other words, one of first and second Coriolis elements 3, 4 is lowered in the direction of substrate 2, while the other of first and second Coriolis elements 3, 4 is raised with respect to substrate 2. These further Coriolis forces are transmitted via first spring elements 32 and further first spring elements 42 to first and second drive frames 30, 40, and are transmitted by first and second drive frames 30, 40 to rocker element 5 via second spring elements 33 and further second spring elements 43.

Alternatively, it is possible for the further Coriolis forces along second direction Z to act essentially only on first and second drive frames 30, 40, and to be transmitted to rocker structure 5 via second spring elements 33 and further second spring elements 43; first and second Coriolis elements 3, 4 are essentially not induced to undergo deflections along third direction Z as a result of the further Coriolis forces along third direction Z. Since the torsional axis 50 along second direction Y extends between first and second Coriolis elements 3, 4, a torque acts on rocker element 5 about torsional axis 50. Rocker element 5 is thus excited to a torsional deflection 52 about torsional axis 50 as a function of the second yaw rate. Micromechanical structure 1 has third detection means 53 for capacitively measuring torsional deflection 52, for this purpose third detection means 53 having flat counter-electrodes, oppositely situated on each end of rocker element 5 along first direction X, which cooperate with flat electrodes which are fixed to the substrate. The flat electrodes are situated along third direction Z, between the flat counterelectrodes and substrate 2. Alternatively, further flat electrodes may be situated on a side of the flat counterelectrodes facing away from substrate 2, so that the flat counterelectrodes are situated along third direction Z, between the flat electrodes and the further flat electrodes. Further substrate anchorings (not illustrated) are optionally provided at first Coriolis element 3, second Coriolis element 4, first drive frame 30, second drive frame 40, and/or rocker structure 5.

Figure 2:
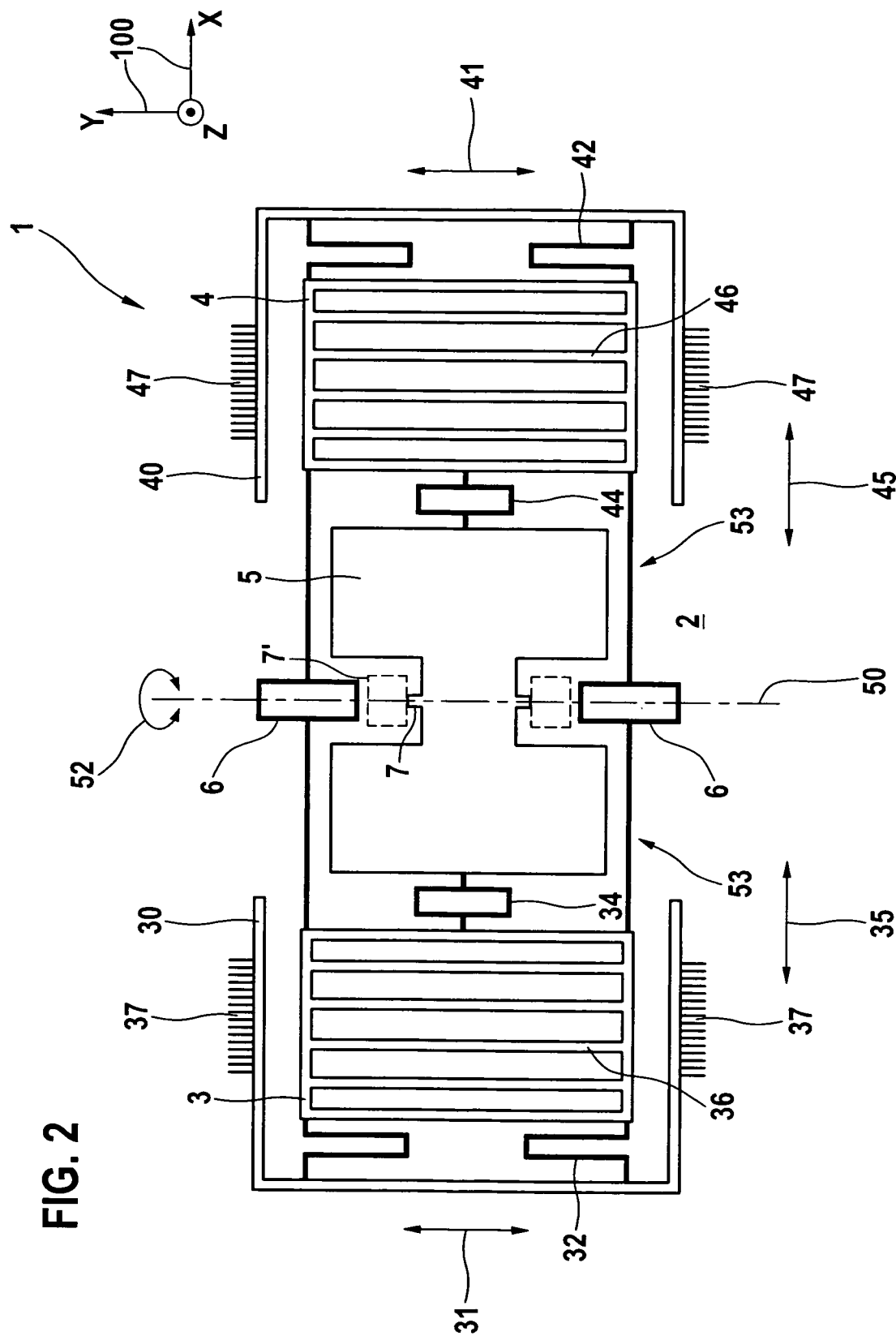
FIG. 2 schematically shows a top view of a micromechanical structure according to a second example embodiment of the present invention.

FIG. 2 shows a schematic top view of a micromechanical structure 1 according to a second example embodiment of the present invention, the second example embodiment essentially corresponding to the first example embodiment illustrated in FIG. 1, first rocker structure 5 having no recess 51 in which first Coriolis element 3, second Coriolis element 4, first drive frame 30, and second drive frame 40 are situated, but instead, rocker structure 5 being situated along first direction X between first and second Coriolis elements 3, 4. Rocker structure 5 therefore has no direct coupling to first drive frame 30 via second spring elements 33, or to second drive frame 40 via further second spring elements 43, and instead is only indirectly coupled to first drive frame 30 via first Coriolis element 3, and only indirectly coupled to second drive frame 40 via second Coriolis element 4. For this purpose, a third spring element 34 is situated between first Coriolis element 3 and rocker structure 5, and which is designed to be more flexible along first and/or second direction X, Y than along third direction Z. Similarly, a further third spring element 44 is provided between second Coriolis element 4 and rocker structure 5. When the second yaw rate is present, rocker structure 5 is then directly induced to torsional deflection 52 by first and second Coriolis elements 3, 4, via third spring element 34 and further third spring element 44.

In a third example embodiment of micromechanical structure 1 according to the present invention, which is essentially the same as the second example embodiment illustrated in FIG. 2, first drive frame 30 or first comb electrode structure 37 is situated in a further first recess in first Coriolis element 3, and second drive frame 40 or second comb electrode structure 47 is situated in a further second recess in second Coriolis element 4. The further first recess and the further second recess preferably each have an open design in the direction of rocker structure 5, so that first drive frame 30 is directly coupled to rocker structure 5, via first spring elements 32, and second drive frame 40 is directly coupled to rocker structure 5, via further first spring elements 42. Alternatively, first drive frame 30 may be situated within a recess in first Coriolis element 3, and similarly, second drive frame 40 may be situated within a recess in second Coriolis element 4. Other permutations of the configurations of Coriolis elements, drive frames, and the rocker structure are also possible.

What is claimed is:

1. A micromechanical yaw rate sensor, comprising:
 a substrate having a main plane of extension;
 a first Coriolis element and a second Coriolis element, wherein the first Coriolis element is configured to be driven to a first vibration, and wherein the second Coriolis element is configured to be driven to a second vibration along a direction antiparallel to the first vibration, and wherein a first deflection of the first Coriolis element and a second deflection of the second Coriolis element are detectable, in each case along a first direction extending parallel to the main plane of extension and perpendicular to a second direction extending parallel to the main plane of extension, and wherein the first vibration occurs along the second direction;
 a rocker element one of indirectly or directly coupled to the first Coriolis element and to the second Coriolis element, wherein the rocker element has a torsional axis essentially parallel to the second direction;
 a first drive frame, wherein the first Coriolis element is driven to the first vibration with the aid of the first drive frame; and a second drive frame, wherein the second Coriolis element is driven to the second vibration with the aid of the second drive frame;

wherein the first Coriolis element and the first drive frame are coupled to one another in a first coupling, and wherein the second Coriolis element and the second drive frame are coupled to one another in a second coupling, each of the first and second couplings being achieved by a respective first spring element, wherein the first spring elements are more flexible along the first direction than along at least one of (i) the second direction and (ii) a third direction perpendicular to the main plane of extension;

wherein the torsional axis is situated along the first direction, between the first and second Coriolis elements;

wherein the rocker element has a recess in which at least one of the first Coriolis element, the second Coriolis element, the first drive frame, and the second drive frame is situated parallel to the main plane of extension.

2. The micromechanical sensor as recited in claim 1, wherein:

the rocker element is coupled to the first Coriolis element by the first drive frame;

the rocker element is coupled to the second Coriolis element by the second drive frame;

one second spring element is situated between the first drive frame and the rocker element, and another second spring element is situated between the second drive frame and the rocker element, the second spring elements being more flexible along the second direction than along the first and third directions.

3. The micromechanical sensor as recited in claim 1, wherein:

the rocker element is situated along the first direction between the first and second Coriolis elements;

one third spring element is situated between the first Coriolis element and the rocker structure, and another third spring element is situated between the second Coriolis element and the rocker structure, the third spring elements being more flexible along the first direction than along the second and third directions.

4. The micromechanical sensor as recited in claim 1, further comprising:

a first detection element and a second detection element, wherein the first deflection is detected with the aid of the first detection element, and wherein the second deflection is detected with the aid of the second detection element, the first detection element being situated within a first recess in the first Coriolis element and the second detection element being situated within a second recess in the second Coriolis element.

5. The micromechanical sensor as recited in claim 4, wherein a torsional deflection of the rocker element about a torsional axis is detected with the aid of at least one third detection element situated along the third direction, between the rocker element and the substrate.

6. A method for operating a micromechanical yaw rate sensor, the sensor including a substrate having a main plane of extension, a first Coriolis element and a second Coriolis element, wherein the first vibration, and wherein the second Coriolis element is configured to be driven to a second vibration along a direction antiparallel to the first vibration, and wherein a first deflection of the first Coriolis element and a second deflection of the second Coriolis element are detectable, in each case along a first direction extending parallel to the main plane of extension, and wherein the first vibration occurs along the second direction, a rocker element one of indirectly or directly coupled to the first Coriolis element and to the second Coriolis element, wherein the rocker element has a torsional axis essentially parallel to the second direction, a first drive frame, wherein the first Coriolis element is driven to the first vibration with the aid of the first drive frame, and a second drive frame, wherein the second Coriolis element is driven to the second vibration antiparallel to the first vibration with the aid of the second drive frame, wherein the first Coriolis element and the first drive frame are coupled to one another in a first coupling, and wherein the second Coriolis element and the second drive frame are coupled to one another in a second coupling, each of the first and second couplings being achieved by a respective first spring element, wherein the first spring elements are more flexible along the first direction than along at least one of (i) the second direction and (ii) a third direction perpendicular to the main plane of extension, the method comprising:

measuring a first deflection of the first Coriolis element of the sensor;

measuring a second deflection of the second Coriolis element of the sensor;

determining, based on the measured first and second deflections, a first yaw rate oriented parallel to a direction perpendicular to the main plane of extension;

measuring a torsional deflection of the rocker element of the sensor about the torsional axis, wherein the rocker element has a recess in which at least one of the first Coriolis element, the second Coriolis element, the first drive frame, and the second drive frame is situated parallel to the main plane of extension; and determining, based on the measured torsional deflection, a second yaw rate parallel to a direction extending parallel to the main plane of extension.

7. The method as recited in claim 6, the first drive frame being driven by a first comb electrode structure of the sensor, and the second drive frame being driven by a second comb electrode structure of the sensor.

* * * * *